United States Patent [19]

Davies et al.

[11] 4,372,385
[45] Feb. 8, 1983

[54] METHOD OF PRETREATING AN UNDERGROUND FORMATION FOR SILICON POLYHALIDE CONSOLIDATION

[75] Inventors: David R. Davies, Rijswijk, Netherlands; Edwin A. Richardson, Houston, Tex.; Marinus Van Zanten, Rijswijk, Netherlands

[73] Assignee: Shell Oil Company, Houston, Tex.

[21] Appl. No.: 263,451

[22] Filed: May 14, 1981

Related U.S. Application Data

[63] Continuation-in-part of Ser. No. 161,239, Jun. 20, 1980, abandoned.

[30] Foreign Application Priority Data

Dec. 17, 1979 [GB] United Kingdom ................ 7943333

[51] Int. Cl.³ .......................................... E21B 33/138
[52] U.S. Cl. .................................... 166/281; 166/292; 166/300
[58] Field of Search ............... 166/270, 271, 273, 274, 166/281, 292, 300, 307

[56] References Cited

U.S. PATENT DOCUMENTS

| | | | |
|---|---|---|---|
| 2,019,908 | 11/1935 | Kennedy et al. | 166/292 |
| 2,308,425 | 1/1943 | Prince | 166/281 |
| 3,055,426 | 9/1962 | Kerver et al. | 166/292 X |
| 3,138,205 | 6/1964 | Kerver et al. | 166/300 X |
| 3,215,199 | 11/1965 | Dilgren | 166/307 X |
| 3,252,513 | 5/1966 | Holmes | 166/292 |
| 3,393,739 | 7/1968 | Rosenberg | 166/300 X |
| 3,743,020 | 7/1973 | Suman, Jr. et al. | 166/281 X |
| 3,929,192 | 12/1975 | Friedman | 166/307 X |
| 4,061,191 | 12/1977 | Meijs et al. | 166/300 X |

*Primary Examiner*—Stephen J. Novosad
*Assistant Examiner*—George A. Suchfield

[57] ABSTRACT

The formation is consolidated by means of a silicon halide compound that reacts with water present on the walls of the formation pore space thereby forming silicon dioxide that bonds the formation grains together. The bonding strength is increased by a pretreatment of the formation grains with an acid in liquid or gaseous form.

3 Claims, No Drawings

METHOD OF PRETREATING AN UNDERGROUND FORMATION FOR SILICON POLYHALIDE CONSOLIDATION

CROSS-REFERENCE TO RELATED APPLICATION

This application is a continuation-in-part of application Ser. No. 161,239 filed June 20, 1980, now abandoned. The disclosure of that application is incorporated herein by cross-reference.

BACKGROUND OF THE INVENTION

The invention relates to a method of consolidating an underground formation. In particular, the present invention relates to a method of consolidating those parts of an underground formation that surround a well or borehole penetrating the formation.

In one respect, the present invention relates to an improved procedure for consolidating an underground formation by the process described in the F. H. Meijs and D. R. Davies U.S. Pat. No. 4,061,191. That method relates to consolidating an unconsolidated gas reservoir by treating it to the extent required to ensure the presence of a significant but small amount of water absorbed on the rock surfaces then injecting enough gaseous silicon polyhalide to convert enough of that water to a grain-bonding silica gel to increase the competency without significantly reducing the permeability. The disclosures of the U.S. Pat. No. 4,061,191 patent are incorporated herein by cross reference.

As indicated in the U.S. Pat. No. 4,061,191 patent, numerous procedures have been proposed for utilizing liquid or gaseous silicon polyhalides in a treatment of subterranean reservoirs. For example, U.S. Pat. No. 2,019,908 discloses plugging a subterranean formation by injecting a nonaqueous silicon polyhalide and then allowing water to infuse and react. U.S. Pat. No. 2,469,354 teaches that a gas drive oil recovery process can be improved by injecting a gas which contains a halosilane and causes an oil-wetting of the rocks and/or plugging of a thief zone. U.S. Pat. No. 2,633,919 teaches that a reservoir can be oil-wetted by injecting a nonaqueous liquid containing a hydrocarbon-substituted silicon halide and then injecting water to hydrolyze the adsorbed halide. U.S. Pat. No. 2,808,886 teaches that a gas drive oil recovery process can be improved by including vapors of volatile hydrolyzable inorganic liquid and water in the gas to form permeability controlling or water-layer-plugging solid metal oxides or silica gels. U.S. Pat. No. 3,055,425 teaches that a reservoir can be consolidated and stabilized by injecting a nonaqueous liquid containing a silicon halide and then heating the treated zone to above about 300° F. U.S. Pat. No. 3,055,426 teaches that where a formation to be consolidated with a silicon halide is oil-wet it should be pretreated with a surfactant which renders the formation water-wet. U.S. Pat. No. 3,087,542 teaches that a water-bearing formation can be plugged by injecting gaseous silicon tetrafluoride to finger through the water and form a radially extensive plug. U.S. Pat. No. 3,090,435 teaches that by injecting a wate-in-oil emulsion followed by a nonaqueous liquid containing a silicon halide, an unconsolidated reservoir can be consolidated. U.S. Pat. No. 3,221,505 teaches that a barrier plug can be formed by injecting a water-miscible liquid followed by a gaseous silicon tetrachloride to form a plug along the interface between it and the water. U.S. Pat. No. 3,252,513 teaches that water can be excluded from a well being gas drilled by injecting aqueous ammonia into a water producing carbonate reservoir ahead of an oil solution of silicon tetrachloride.

U.S. Patent application Ser. No. 117,697 filed Feb. 1, 1980, now Pat. No. 4,241,791 by D. R. Davies and E. A. Richardson also relates to an improvement in the U.S. Pat. No. 4,061,191 process; for increasing the uniformity of the consolidation of reservoirs containing layers of different effective permeability. In the process of that application the reservoir is pretreated by injecting a permeability-adjusting smoke so that substantially dry solid particles are screened out on the faces of the layers in a manner tending to equalize their effective permeabilities. In such reservoirs the present invention can be used in conjunction with the process of that application and the disclosures of the application are incorporated herein by cross-reference.

Underground formations containing fluids such as hydrocarbon fluids (oil and/or gas) or water that are being recovered via the wells penetrating such formations, often comprise layers of unconsolidated or incompletely consolidated formation grains. Such grains (hereinafter also referred to as sand or sand particles) may be torn from the formations by fluid flowing into the wells, and are likely to obstruct the fluid passages in the well and/or the surface equipment communicating with the well. The tubing in the well may even be locally damaged by the erosive action of sand carried by the fluid streams that impinge on the walls of the tubing.

Numerous techniques for consolidating such sand-producing formations have already been proposed in the past, and a number of these techniques have been proven successful in the field. The consolidating agents that are used in these techniques are of widely differing compositions, such as various types of resinous materials, water glass compositions, aluminum oxide cementing materials, and silicon halide compounds.

The present invention relates in particular to formation consolidating treatments using silicon halide compounds as the consolidating agents. These agents have been found to be easy to employ in the field. By a simple injection technique, the silicon halide compound can be injected either in gaseous or in liquid form down the well and into the formation parts to be treated. As indicated in the U.S. Pat. No. 4,016,191 patent, it is imperative that some water be present around the contact points of adjacent sand grains in the formation parts into which the silicon halogen compound is injected. The following reaction will then take place:

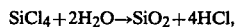

$$SiCl_4 + 2H_2O \rightarrow SiO_2 + 4HCl,$$

and the amorphous silicon dioxide formed by this reaction will bond the formation grains together, thereby increasing the compressive strength of the formation parts. In order to retain a sufficient permeability of the consolidated formation parts, the water should be present in relatively small quantities.

The majority of underground formations that are to be treated for consolidation purposes are water-wet and can be consolidated by means of a silicon halide without a water-wetting pretreatment. In general, underground formations either already contain water adhering to the walls of the pore space, or can easily be wetted by injecting water thereinto via the well or borehole that penetrates the formation parts to be consolidated. When an excessive amount of water is present in the pore space of such a formation, this might lead to an undesirable reduction of permeability after the consolidation. In such situations, prior to injecting the consolidating agent, the excess amount of water should be displaced from the formation parts to be consolidated by injecting dry gas through the pore space (in case of a gas-containing formation) or injecting a non-polar liquid therethrough (in case of a liquid-containing formation). The volume of the water-displacing fluid is to be chosen such that a sufficient amount of water remains on the wall of the pore space for consolidating purposes without undesirable permeability impairment. As indicated in the U.S. Pat. No. 4,061,191 patent, the water content is preferably adjusted to from about 3–7% by weight.

The application of silicon halide compounds as consolidating agent is in particular advantageous since it does not require a pretreatment of the formation whereby all the water is removed from the pore space of the formation parts to be treated, as is required in almost all other consolidating operations. In those other operations the presence of a water film on the surface of the formation particles prevents the consolidating agent from bonding to the surface of the formation particles, which results in a weak consolidation. Water removal from the surface of water-wet formation particles is a costly operation and in practice has been found to be difficult to carry out with the required efficiency, and it will be appreciated that it is found attractive to use a consolidating agent that reacts with water present around the contact points of adjacent sand grains. Such agent can be placed in the formation by means of a simple operation that can be carried out at relatively low cost.

Although the sand consolidation treatments described in the U.S. Pat. No. 4,016,191 patent have been generally successful, samples from certain reservoirs or certain portions of reservoirs have indicated a need for imparting a greater compressive strength. In those situations the reservoir rocks within the zone being treated were found to be only partially water-wetted. For example, in a typical sample of sand grains that were partially consolidated, it was found that although some portions of the grain surfaces were water-wet (and were bonded to a coating of siliceous cement) other portions were not water-wetable and were free of such a cement.

SUMMARY OF THE INVENTION

The present invention relates to an improved process for increasing the rock strength of an imcompletely water-wetted gas-producing reservoir which is susceptible to impairment by water-blocking and is, or is likely to become, unconsolidated. The water content of the reservoir zone to be consolidated is adjusted to the extent necessary to provide a significant but small proportion of water within that zone. A pretreatment gaseous fluid which reacts with water to form a strong aqueous acid capable of increasing the extent of which rock surfaces are water-wet is injected into that zone to increase the water-wetness of the rock surfaces. The water content of that zone is then readjusted to the extent necessary to ensure the presence of a significant but small proportion of water in the aqueous liquid in contact with the water-wet rock surfaces. A sand consolidating gaseous mixture of vaporous silicon polyhalide having a water reactivity at least substantially equivalent to that of silicon tetrachloride and substantially inert gas is then injected into the zone to be treated, in order to convert a significant proportion of the rock-wetting water to a rock-strengthening silica gel, without unduly reducing the effective permeability of the reservoir.

DESCRIPTION OF THE INVENTION

The wettability of the rocks in a subterranean reservoir relates to the extent by which the rock surfaces can be wetted by a given fluid. Where the water-wettability is less than complete within a reservoir which contains water and oil, some, but not all, areas of the rock surfaces may be water-wet while the remainder are oil-wet and/or at least some of the rock surfaces may exhibit at least some tendency to become wetted by either the water or oil. In addition, it is known that in general the water-wetness of a reservoir containing oil and water can be increased by injecting water-wetting agents such as aqueous solutions of surfactants, acids, or the like.

As indicated in the U.S. Pat. No. 4,061,191 patent, if a gas-producing reservoir which is susceptible to water-blocking is to be consolidated by an injection of a silicon polyhalide vapor in inert gas, the rock surfaces should be water-wet and the proportion of water which is capable of being converted to a grain-bonding silica gel should be neither too small nor too large. The present invention is, at least in part, premised on a discovery that in such a reservoir in which sand grains are incompletely water-wetted, the relative strength and/or area of the water-wettability (and, therefore, the strength of the resulting consolidation) can be increased by a pretreatment injection of a gaseous fluid which reacts with water to form a strong aqueous acid. Where the injected fluid is gaseous, its injection avoids the introduction of more water which could cause water-blocking. And, where the injected fluid is gaseous, it tends to flow into exactly the same pores and zones within the reservoir which will subsequently be contacted by the subsequent inflow of gaseous sand consolidating fluid.

To explain the method according to the invention in more detail, five Experiments and one Field Test will be described hereinafter by way of example. For the sake of simplicity, all Experiments are based on the following Standard Treatment.

Standard Treatment

A sand pack was prepared by filling a tube having a diameter of about 36 millimeters and a length of about 18 centimeters with a sand from South West Ampa Field in the State of Brunei. The sand was obtained from a poorly consolidated, gas-producing reservoir and the sand grain size ranged downward from about 200 microns to less than 2 microns. The surfaces of those sand grains were only partially water-wettable. In forming the sand pack, the sand grains were uniformly mixed with tap water in a proportion of about 5% by weight of the sand. However, because of the incomplete water-wettability, the amount of water which actually wet the grain surfaces was significantly less than it would have been in a pack of similarly sized grains which were completely water-wettable and were mixed with the same proportion of water.

The sand pack in the tube was subsequently consolidated, at ambient conditions of normal laboratory temperature and pressure, by passing a "Standard Treatment" gaseous mixture of $SiCl_4$ and $N_2$ (24% w $SiCl_4$ and 76% w $N_2$) through the pack at a rate of 6 liters per minute (l/min) for a period of 10 minutes.

After the consolidation treatment the tube was broken and the consolidated sand pack cut transversely in five equal sections of 3.6 centimeters. The parts were numbered consecutively 1-5 starting from the injection side of the tube, and the strength of the samples was thereafter determined by means of a Brinell Hardness Number meter. Equipment for measuring Brinell Hardness Number (BHN) has been described by A. C. van der Vlis in the lecture "Rock Classification by a Simple Hardness Test" presented at the Second Congress of the International Society of Rock Mechanics (September 1970).

The hardness values indicated in Table A were measured as a result of the Standard Treatment carried out at a temperature of 293 K and a pressure of 1 bar. Results substantially equal to the data of Table A were also obtained when carrying out the Standard Treatment at 373 K and 150 bar.

TABLE A

| Section | BHN (kg/mm$^2$) |
|---------|-----------------|
| 1       | 2.2             |
| 2       | 2.5             |
| 3       | 2.4             |
| 4       | 2.9             |
| 5       | 2.5             |

EXPERIMENT 1

In this experiment, a sand pack of the type described above was pretreated prior to a Standard Treatment at ambient conditions (consisting of injecting 24% w $SiCl_4$ and 76% w $N_2$ at a flow rate of 6 l/min for 10 min).

During the pretreatment, a relatively very dilute gaseous mixture of $SiCl_4$ and $N_2$ consisting of 0.24% w $SiCl_4$ and 99.76% w $N_2$, was passed through the sand pack for a period of 25 min. at a flow rate of 6 l/min. During this pretreatment period the rate at which the $SiCl_4$ was injected was only 1/100th that used in the Standard Treatment, while the duration was 2.5 times as long.

The Brinell Hardness Test (see Table 1) taken at the end of Experiment 1 showed a considerable increase in compressive strength of the various parts of the sand pack as compared with the results of Table A.

TABLE 1

| Section | BHN (kg/mm$^2$) |
|---------|-----------------|
| 1       | 4.5             |
| 2       | 4.9             |
| 3       | 5.2             |
| 4       | 4.9             |
| 5       | 4.7             |

EXPERIMENT 2

This experiment was performed in order to check the above theory, which is based on the cleaning and water-wetting action performed by the HCl generated during the pretreatment of Experiment 1. The influence of hydrochloric acid pretreatment on the compressive strength of a consolidated sand pack was investigated. In a sand pack of the type described above the consolidating step of the Standard Treatment was preceded by an injection of an aqueous solution of 15% w HCl.

The HCl solution was passed through the sand pack as used in the Standard Treatment, thereby displacing the tap water from the sand pack. Subsequently, nitrogen gas free of $SiCl_4$ was passed through the sand pack to displace the major part of the HCl solution, until an amount of solution equal to 5% w of the sand pack was left within the pack.

Thereafter, a consolidation by the Standard Treatment was carried out, and a Brinell Hardness Test was conducted at ambient conditions. The test results are shown in Table 2.

TABLE 2

| Section | BHN (kg/mm$^2$) |
|---------|-----------------|
| 1       | 3.9             |
| 2       | 3.7             |
| 3       | 3.9             |
| 4       | 4.4             |
| 5       | 3.9             |

Since all values are substantially higher than that in Table A, it may be concluded that the pretreatment by HCl improves the quality of the consolidation. The values in Table 2 are, however, slightly lower than values in Table 1. In Experiment 2, the HCl in the aqueous HCl solution effectively replaced its equivalent volume of $H_2O$. Since the total amount of aqueous liquid in the sand packs in Experiments 1 and 2 was only 5% by weight of the sand, the pack used in Experiment 2 contained less $H_2O$ (by the amount replaced by the HCl). This resulted in the reduction in consolidated rock hardness indicated in Table 2.

EXPERIMENT 3

In Experiment 1 the sand grains were pretreated with hydrochloric acid generated by the reaction of silicon tetrachloride with water present in the sand pack, during a period of 25 min. Thereafter, the sand was consolidated by means of the Standard Treatment.

In order to better define the time required for the sand to be pretreated, a series of experiments of the type of Experiment 1 were carried out in which the exposure time of the sand grains to the acid generated by the reaction between $SiCl_4$ and water was varied. The exposure time was varied by flushing the pretreatment gaseous mixture of $SiCl_4$ and $N_2$ (0.24% w and 99.76% w, respectively) through the sand packs at a rate of 6 l/min. for various periods of time.

The packs were then consolidated by the Standard Treatment.

The results of Brinell Hardness Tests are shown in Table 3.

TABLE 3

| Pretreatment period (min) | Average BHN (kg/mm$^2$) |
|---------------------------|--------------------------|
| 0                         | 2.5                      |
| 4                         | 2.5                      |
| 6                         | 2.5                      |
| 8                         | 2.5                      |
| 10                        | 3.5                      |
| 13                        | 4.5                      |
| 24                        | 4.5                      |

(1) The BHN value is given as an average of the BHN values of the five sections into which the sand pack was cut after consolidation.

(2) The experiments were carried out under ambient conditions.

It can be seen that no improvement in strength is observed for treatment times up to 8 min. From 8 min. to 13 min. treatment times there is a rapid improvement in strengths. Treatment times longer than 13 min. did not, in this case, give any better results.

EXPERIMENT 4

The procedure described in Experiment 3 was repeated but now under reservoir conditions at 373 K and 150 bar, instead of the ambient conditions reported previously. The results are given in Table 4.

TABLE 4

| Pretreatment period (min) | Average BHN (kg/mm$^2$) |
| --- | --- |
| 0 | 2.5 |
| 5 | 5.0 |
| 10 | 5.0 |
| 24 | 5.0 |

The time required for the generated hydrochloric acid to act on the sand so that optimum results are achieved is less than 5 min. under these conditions of elevated temperature and pressure and has considerably been reduced as compared with the period required to obtain optimal results at the ambient temperature and pressure conditions of Experiment 3.

EXPERIMENT 5

This experiment was carried out in a sand pack of the type used in the Standard Treatment. In this experiment, however, oil instead of gas was present in the pore space of the sand pack, which oil was displaced by condensate (which is a hydrocarbon mixture with a volatility equivalent to that of gasoline).

Since the surfaces of those sand grains were only particularly water-wettable, a film of water in an amount equal to 5% w of the sand pack was left within the pack, on the surface of the grains and in the non-wetted pore spaces. The condensate was subsequently removed from the pore spaces by a volume of nitrogen gas prior to carrying out a pretreatment by means of acid.

In the pretreatment, hydrochloric acid was used in gaseous form, which acid was displaced through the pore space of the sand pack by an inert gas (such as nitrogen) at a rate of 6 l/min.. Subsequently the silicon tetrachloride/nitrogen mixture was passed through the sand pack as described in the Standard Treatment and finally the following Brinell hardness values were measured (see Table 5).

TABLE 5

| Section | BHN (kg/mm$^2$) |
| --- | --- |
| 1 | 4.0 |
| 2 | 3.8 |
| 3 | 4.3 |
| 4 | 4.0 |
| 5 | 3.9 |

This experiment was carried out under ambient conditions.

In the previous field applications of a consolidating process in which a stream of silicon tetrachloride vapor is carried down to a gas producing formation by a stream of N$_2$ carrier gas, it has been common practice to consolidate the formation rapidly by injecting the silicon tetrachloride at a rate of 10 l/min. The production performance of the wells thus treated indicated, however, that the sand was not optimally consolidated as might have been expected from the results obtained by simulating laboratory experiments.

To improve the consolidating treatment, the method according to the present invention was carried out in the following field test.

Field Test

During the field test, a pretreatment was carried out in the formation parts to be consolidated. In the pretreatment, silicon tetrachloride was injected for a period of 30 minutes at a low rate of $0.25 \times 10^{-3}$ m$^3$/min. (STP; 0° C. and 760 mm pressure) mixed with a carrier gas (consisting of nitrogen), which carrier gas was injected at a rate of 13.4 m$^3$/min. (STP).

The pretreatment SiCl$_4$/N$_2$ mixture contained 2.2% w SiCl$_4$. The low injection rate of the silicon tetrachloride allowed the silicon tetrachloride to react with the water present in the formation pore space.

After the pretreatment, a sand-consolidating SiCl$_4$/N$_2$ mixture was injected at an increased rate of $0.7 \times 10^{-3}$ m$^3$/min. SiCl$_4$ and 26.8 m$^3$/min. N$_2$ (STP). This mixture contained 24% w SiCl$_4$. and was injected for 150 minutes. The subsequent production period showed that no weak consolidation zone was present at the well bore.

Summarizing, it is observed that the present invention is directed to pretreating the grains within a subterranean reservoir. The pretreatment is preferably effected by injecting a gaseous fluid which reacts with water to form a strong aqueous acid that is capable of increasing the extent to which the grain surfaces are wetted with water. Such a pretreatment is conducted or subsequently adjusted in a manner such that a small but significant proportion of water remains within the zone in which the grains are to be consolidated.

The sand grains within the pretreated zone are then consolidated by injecting sufficient silicon polyhalide (mixed with inert gas) to convert the water which wets those grains to a grainbonding silica gel. In a reservoir in which the water content is initially quite low and/or water blocking is not a significant problem, the pretreatment may be effected by injecting a strong aqueous acid such as hydrochloric acid. However, (for example, as indicated by the relative strengths of the consolidations attained in Experiments 1 and 2) it may be desirable to follow such an acid-injection with an injection of sufficient water to ensure that the water content of the aqueous liquid that wets the grains is high enough to provide a strong consolidation. The generation of the grain-wetting acid in situ by a slow rate injection of silicon polyhalide (diluted with inert gas) is particularly preferred. And, the use of silicon tetrachloride as both the pretreatment and sand consolidation polyhalide is especially preferred.

It will be appreciated that any fluid (gas or liquid) used for carrying the silicon halogen compound into the formation should be "dry", that is, should not contain more water than can react with 10% w of the injected silicon halogen compound. Further, any excess amount of water in the pore space of the formation parts to be treated should be removed therefrom by passing a gas with a low water vapor content or a non-polar liquid (such as condensate which is a hydrocarbon mixture with a volatility equivalent to that of gasoline) through the formation. If the amount of water in the pore space is insufficient for consolidating purposes, a gas containing a mist of water particles is passed through the formation. In an alternative way, a slug of water may be passed through the formation prior to passing a gas with low water vapor content or a non-polar liquid (such as condensate) through the formation.

Slugs of inert fluids may be passed through the formation pore space between successive slugs of treating fluids (including fluids for controlling the water content of the pore space).

Apart from the silicon tetrachloride applied in the Standard Treatment, the Experiments and the Field Test, other silicon halogen compositions such as silicon hexachloride, silicon octochloride and silicon fluoride may be used with equal results.

The silicon halogen composition may be injected in any concentrations suitable for the purpose. The ratio between the weight injection rates of the silicon tetrachloride during the consolidation treatment and the pretreatment is between 5:1 and 500:1.

What is claimed is:

1. A process for increasing the rock strength of an imcompletely water-wetted gas-producing reservoir, which is susceptible to impairment by water-blocking and is, or is likely to become, unconsolidated, comprising:

adjusting the water content in a portion of the reservoir to the extent necessary to provide a significant but small proportion of water within that portion;

injecting a pretreatment gaseous fluid which reacts with water to form a strong aqueous acid capable of increasing the water-wetness of the surfaces of the grains within the treated portion of the reservoir;

readjusting the water content of the treated portion of the reservoir to the extent necessary to ensure the presence of a significant but small proportion of water within the aqueous liquid which wets the grains; and, injecting a sand consolidating gaseous mixture of vaporous silicon polyhalide having a water reactivity at least substantially equivalent to that of silicon tetrachloride and substantially inert gas, in order to convert a significant proportion of the grain-wetting water to a rock-strengthening silica-gel, without an undue reduction in permeability.

2. The process of claim 1 in which (a) the injected pretreatment gaseous fluid is a mixture of vaporous silicon tetrachloride and nitrogen gas and (b) the sand consolidating gaseous mixture is a mixture of vaporous silicon tetrachloride and nitrogen gas which is many times more concentrated than the pretreatment mixture.

3. The process of claim 2 in which the concentrations of silicon tetrachloride in, respectively, the pretreatment gaseous fluid and the consolidating gaseous fluid and the rates at which those fluids are injected are arranged so that the rate at which the silicon tetrachloride enters the reservoir during the pretreatment ranges from about 1/5th to 1/500th of the rate at which it enters the reservoir during the consolidation treatment.

* * * * *